Figures 1, 2, 3:
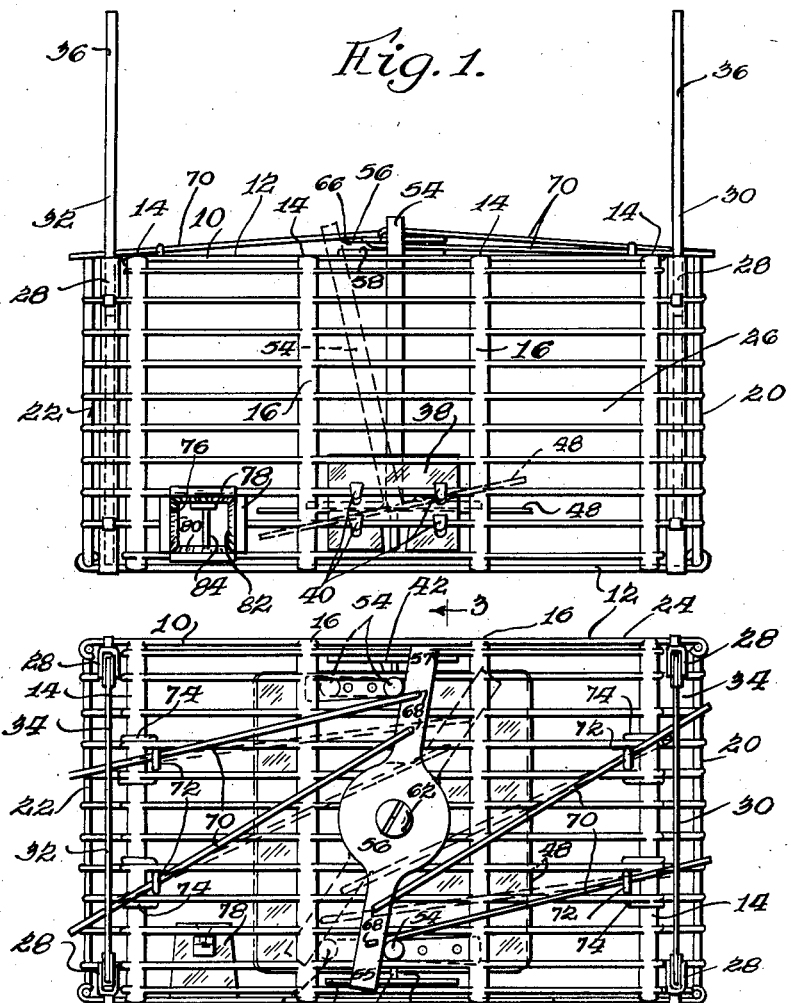

July 25, 1939.   W. E. BOWMAN   2,167,291
TRAP
Filed July 23, 1936

Inventor
Walter E. Bowman
By Robert van Sickler
Attorney

Patented July 25, 1939

2,167,291

UNITED STATES PATENT OFFICE 2,167,291

TRAP

Walter E. Bowman, Norfolk, Va.

Application July 23, 1936, Serial No. 92,229

2 Claims. (Cl. 43—61)

This invention pertains to traps and particularly to the types used to capture rodents which occasionally infest homes and commercial houses.

It is an object of my invention to construct a trap which does not kill or maim the animal but to cage it until it may be exterminated in the most humane manner.

Another object of my invention is to permit the platform to be operated by the weight of the animal within the trap to simultaneously operate the release for the doors at either end.

Still another object of my invention is to provide a well ventilated trap.

A further object of my invention is to permit of access to the interior of the trap without rasing the door while the animal is encaged.

A still further object of my invention is to construct means for setting the trap without danger to the setter.

With these and various other objects in view, the invention may consist of certain novel features of construction and operation as will be more fully described and particularly pointed out in the specification, drawing and claims appended hereto.

In the drawing, which illustrates an embodiment of the device, and wherein like reference characters are used to designate like parts, Figure 1 is a front elevation of my device in set position with the closed position of certain parts shown in dotted lines, Figure 2 is a similar top plan view while Figure 3 is a vertical sectional view taken on the line 3—3 of Figure 2.

The top of the trap, 10, is composed of a wire network, comprising individual wires 12 secured together by cross pieces or braces 14, of which there are four, and extend downwardly at the outer ends to form side braces 16 and continue around under the bottom to be bound together at 18 thus forming bottom braces 19. The two sides and top are likewise formed of a wire network, the individual wires 12 being suitably spaced from each other and are secured in any well known manner to the braces as by swaging or crimping.

The two ends 20 and 22 are open but are adapted to be closed as will be described later. Secured to the sides 24 and 26 of the trap and adjacent the ends are guide members 28, adapted to slidingly receive the doors 30 and 32. These doors are likewise composed of spaced wire lengths 34, secured to the side members 36.

On each side of the trap and centrally disposed are two plates 38. These plates are secured to the side wire members by any well known means as at 40. Formed out of these two plates 38 are flanges 42 which extend inwardly of the trap a sufficient distance to be engaged at 44 by a fulcrum support member 46. A platform 48 is provided having an opening 50 which is adapted to be engaged by the member 52 of the support member 46. Secured on top but adjacent the sides of this platform 48 and centrally of this door are two vertical rods 54 which extend a sufficient distance above the top of the trap so as to have cooperative engagement with a lever 56 as by striking. This lever is provided with arms 55 and 57 extending therefrom.

Secured to the top of the trap and centrally thereof is a plate 58. A bolt 60 having a head 62 and nut 64 is inserted through the plate 58, a spacer 66 and the lever 56. Apertures 68 are located in the lever 56 and adapted to receive operating rods 70. There are two of these operating rods on each side of the center of the lever and each pair extends toward the opposite doors 30 and 32. On the top of the trap and just inside of the doors are guide loops 72 which are secured to the top braces 14, as by loop 74.

There is provided means for permitting access to the interior which comprises an opening 76 formed by a plate 78 secured to the side wire members and having flanges 80 tapering inwardly to provide a reduced opening 82. A pivoted lever 84 is secured to the top flange and arranged to hang in the central portion of the reduced opening 82 to prevent exit of a relatively small animal through this opening. This construction has not been shown in Figure 3 for the purpose of avoiding confusion in the drawing. This lever 84 may be weighted to insure non-exit and more than one of the levers may be used.

Referring to Figure 1, the doors 30 and 32 are shown released as indicated by the dotted line positions of the platform 48 and the rods 54. In Figure 2, the lever 56, the rods 54, the platform 48 and the rods 70 are dotted to show their respective positions when the mechanism is actuated. Figure 3 is a vertical sectional view taken on the line 3—3 of Figure 2 to show the relative position of the operating members when the device is in so called open position.

*Operation*

When the device is in open poistion, the trap is baited by placing food on the platform or upon the prongs 63 extending from bolt 60 so that an animal upon entering the trap will of a necessity cause the platform to drop or swing downwardly because of the animal's weight upon the platform. The slightest weight, such as the animal's paw will cause this platform to tilt and so operate the connecting apparatus.

The tilting of the platform causes the rods 54 to lean in the direction shown by the dotted lines in Figures 1 and 2 thus, if the tilt is to the left, the rod 54 on the near side bears against the arm 55 of the lever 56 and if the platform is tilted to the right, the other rod 54 bears against the arm 57. In each case, the lever 56 is moved in a clockwise direction which causes the four rods 70 to be drawn inwardly from under wires 34 of the doors, thus permitting the doors 30 and 32 to drop simultaneously and close the ends 20 and 22.

What I claim as my invention is:

1. In a trap, two end closures, a fulcrumed platform, a lever, means connected at right angles to said platform for striking said lever, and means connected to said lever for holding said end closures in open position substantially above said trap, said lever striking means and said second means being operated by movement of said platform.

2. In a trap, two end closures, slidably mounted on said trap, a fulcrumed platform, a lever, members connected at right angles to said platform and having cooperative striking engagement with said lever, and door supporting means connected to said lever, said members and said means and operable upon movement of said platform.

WALTER E. BOWMAN.